(12) United States Patent
Rivera-Rodriguez

(10) Patent No.: US 12,063,123 B1
(45) Date of Patent: Aug. 13, 2024

(54) TECHNIQUES FOR INFERRING CONTEXT FOR AN ONLINE MEETING

(71) Applicant: Microsoft Technology Licensing, LLC, Redmond, WA (US)

(72) Inventor: Juan C. Rivera-Rodriguez, Doral, FL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/211,884

(22) Filed: Jun. 20, 2023

(51) Int. Cl.
*H04L 12/18* (2006.01)
*G06V 10/25* (2022.01)
*G06V 40/20* (2022.01)

(52) U.S. Cl.
CPC .......... *H04L 12/1831* (2013.01); *G06V 10/25* (2022.01); *G06V 40/20* (2022.01)

(58) Field of Classification Search
CPC ..... H04L 12/1831; G06V 10/25; G06V 40/20
USPC ........................................................ 709/204
See application file for complete search history.

(56) References Cited

U.S. PATENT DOCUMENTS

| | | | |
|---|---|---|---|
| 9,756,286 | B1 | 9/2017 | Faulkner |
| 10,810,897 | B2 | 10/2020 | Dechu et al. |
| 2007/0288559 | A1 | 12/2007 | Parsadayan et al. |
| 2016/0006981 | A1 | 1/2016 | Bauman et al. |
| 2018/0308473 | A1 | 10/2018 | Scholar |
| 2019/0147367 | A1* | 5/2019 | Bellamy ............... G06N 20/00 706/12 |
| 2021/0224336 | A1 | 7/2021 | Bright |
| 2021/0249009 | A1 | 8/2021 | Manjunath et al. |
| 2021/0358188 | A1 | 11/2021 | Lebaredian et al. |
| 2022/0271963 | A1 | 8/2022 | Shah et al. |
| 2023/0058470 | A1 | 2/2023 | Chandrashekar et al. |

(Continued)

FOREIGN PATENT DOCUMENTS

WO 2020139865 A1 7/2020

OTHER PUBLICATIONS

Abdollahpour, Mohammad Mahdi, "Zero-shot Question Answering with Large Language Models in Python", Retrieved from: https://medium.com/nlplanet/zero-shot-question-answering-with-large-language-models-in-python-9964c55c3b38, Aug. 30, 2022, 9 Pages.

*Primary Examiner* — Glenford J Madamba
(74) *Attorney, Agent, or Firm* — Schwegman Lundberg & Woessner, P.A.

(57) ABSTRACT

Described herein are techniques for generating insights, including summary descriptions, for an online meeting. During an online meeting, various pre-trained computer vision algorithms are used to identify regions of interest within one or more video streams depicting a meeting participant, and any video stream via which content is being shared. These detected regions of interest are further processed with additional pre-trained computer vision algorithms to detect non-verbal communications, including gestures made by meeting participants, facial expressions or emotions, and text or graphics shared as part of a content sharing feature. From these non-verbal communications, textual descriptions of the detected communications are derived. These textual descriptions of the detected communications are then provided as an input to a software-based meeting analyzer service, which is configured to generate various insights based on end-user queries, and automated requests.

18 Claims, 11 Drawing Sheets

(56) References Cited

U.S. PATENT DOCUMENTS

2023/0237837 A1* 7/2023 Shepherd ............. G06V 40/169
 382/104
2023/0403174 A1* 12/2023 Mohanty ................. H04L 51/02

* cited by examiner

<2024-05-10::12:00 PM PT><MEETING PARTICIPANT #1><NAME: JOHN DOE>:: HI, MY NAME IS JOHN DOE. THANKS FOR JOINING US TODAY. WE WILL BE GOING THROUGH A QUICK PRESENTATION THIS AFTERNOON, AND WILL HAVE SOME TIME FOR QUESTIONS AT THE END...
*** ⟵ 702

<2024-05-10::12:05 PM PT><MEETING PARTICIPANT #3><NAME: BARNEY RUMBLE><GESTURE DETECTED: HEAD NOD>:: BARNEY RUMBLE NODDED HIS HEAD TO EXPRESS AGREEMENT WITH PRIOR STATEMENT BY MEETING PARTICIPANT #2, JANE SMITH, IN RESPONSE TO JANE SMITH'S STATEMENT...
⟵ 704
***

<2024-05-10::12:06 PM PT><MEETING PARTICIPANT #2><NAME: FRED FLYN>:: HI, THIS IS FRED FROM ACCOUNTING. I HAVE A FEW SLIDES I WILL SHARE TODAY...

***

<2024-05-10::12:08 PM PT><MEETING PARTICIPANT #2><NAME: FRED FLYN><SHARED CONTENT:TYPE: SCREENSHARE>::
⟵ 706

<TEXT1>:WHAT ASSETS ARE NEEDED FOR MEETING DIGITIZATION?
<TEXT2>:WHAT PEOPLE SAY
<TEXT3>:MEETINT TRANSCRIPT CAPTURES THE ESSENCE OF THE MEETING.
<TEXT4>:IT GIVES A PERSPECTIVE ON THE INTERACTIONS DURING THE MEETING.
<TEXT5>:WHAT PEOPLE SHOW
<TEXT6>:SHARE CONTENT IN STAGE GIVES CONTEXT TO THE TRANSCRIPT.
⟵ 708
***

<2024-05-10::12:09 PM PT><MEETING PARTICIPANT #3><NAME: BARNEY RUMBLE><GESTURE DETECTED: THUMBS UP>:: BARNEY RUMBLE GAVE A THUMBS-UP GESTURE, EXPRESSING AGREEMENT WITH CONTENT PRESENTED ON SLIDE 3 BY MEETING PARTICIPANT #3, FRED FLYNN.
⟵ 710
***

<2024-05-10::12:09 PM PT><MEETING PARTICIPANT #4><NAME: JILL JONES><CHAT MESSAGE: ALL>:: THIS SLIDE PRESENTATION IS GREAT. I AGREE WITH FRED'S ASSESSMENT OF THE SITUATION.

FIG. 7

TECHNIQUES FOR INFERRING CONTEXT FOR AN ONLINE MEETING

TECHNICAL FIELD

The present application relates to video-based meetings conducted over computer networks, such as the Internet. More specifically, the present application describes methods, systems, and computer program products, for generating text to describe or represent non-verbal communications identified within a video, using computer vision algorithms, and for extracting text (e.g., word groups) from content that has been shared during an online meeting, and then to provide these textual elements as input to a meeting analyzer service that leverages a generative language model to generate summary descriptions of the online meeting.

BACKGROUND

Online video conferencing and meeting services have revolutionized the way individuals and teams connect, enabling seamless collaboration regardless of distance. These platforms and services provide a virtual space where participants can join from anywhere, whether it's a one-on-one, small team huddle or a large-scale conference. With features like content sharing, users can effortlessly present documents, slideshows, and multimedia files, fostering engagement and enhancing productivity. These online meeting services facilitate real-time communication through high-quality video and audio, ensuring clear interactions and enabling participants to see and hear each other clearly. With intuitive interfaces, easy scheduling options, and versatile chat functionalities, online video conferencing and meeting services offer a comprehensive solution for effective and dynamic remote collaboration.

BRIEF DESCRIPTION OF THE DRAWINGS

Embodiments of the present invention are illustrated by way of example and not limitation in the figures of the accompanying drawings, in which:

FIG. 7 is a diagram illustrating an example of an annotated text-based transcript for an online meeting, as generated to include text describing non-verbal communications and word groups extracted from presentations, consistent with embodiments of the present invention.

DETAILED DESCRIPTION

Described herein are methods, systems, and computer program products, for inferring meeting context for an online meeting, for example, by analyzing video to identify non-verbal communications and by extracting word groups from content shared during the online meeting. The meeting context is generated in the form of text, which is then used in combination with text from other sources of information to generate insights regarding a meeting. For example, the text may be provided as an input to a software-based meeting analyzer service, which allows an end-user to submit queries and ask question to gain insights about what occurred during an online meeting. In the following description, for purposes of explanation, numerous specific details are set forth to provide a thorough understanding of the various aspects of different embodiments of the present invention. It will be evident, however, to one skilled in the art, that the present invention may be practiced without all of these specific details.

Online meeting services, sometimes referred to as video conferencing platforms, allow meeting participants to connect and communicate in real-time through audio, video, and collaborative content presentation and screen sharing tools. With many online meeting services, each meeting participant will register to create an account, typically providing an email address and establishing a username and password that are then used for verification purposes. Meeting participants can schedule meetings in advance, for example, by specifying a date, time, and meeting duration, and then sharing a unique meeting identifier that other meeting participants will use to join or enter the online meeting.

Once a meeting participant has joined the online meeting, the meeting participant typically has the option to select and configure (e.g., enable/disable) their audio and video devices. These devices may include, for example, a microphone, speaker(s), and a camera having video-capture capabilities. These devices may be built into the client computing device on which the client software application for the online meeting service is installed and executing. Alternatively, a meeting participant may elect to use an external microphone, external speaker(s), including a headset with combined microphone and speakers, or an external video camera, which may provide for a higher quality experience.

Figure 1:
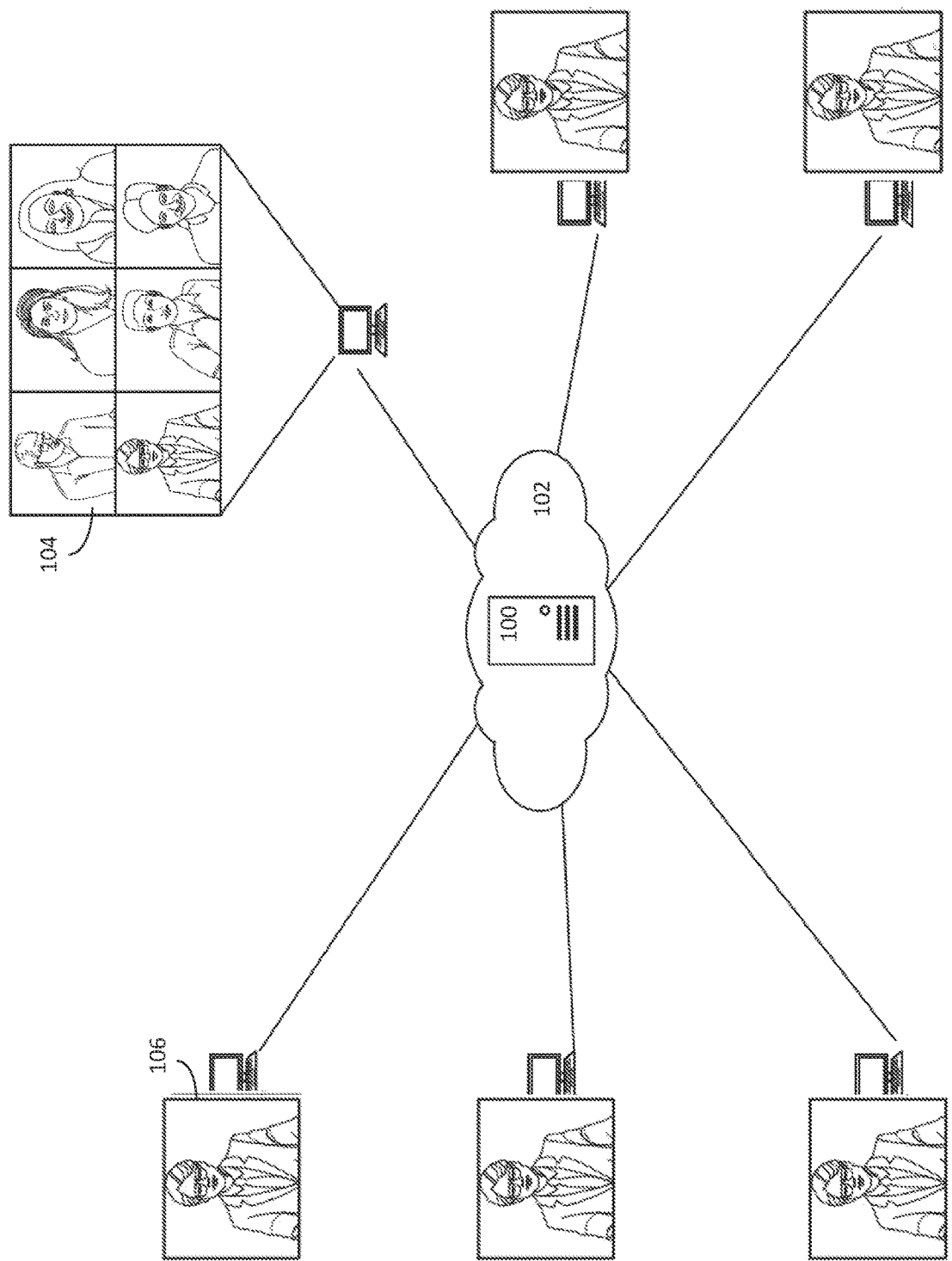
FIG. 1 is a diagram illustrating an example of a computer networking environment with which an online meeting service is deployed, consistent with some embodiments.

As illustrated in FIG. 1, an online meeting service 100 establishes a real-time audio and video connection between the meeting participants. The client software application, which executes at each meeting participant's client computing device, uses audio and video codecs to compress and transmit the audio and video data over a network 102, such as the Internet. Meeting participants can communicate with one another by speaking and listening through their client computing device's microphones and speakers, while viewing a video stream via their device's display. The client-based software application for the online meeting service may allow each participant to select from amongst several different visual arrangements via the user interface. For example, as illustrated with reference number 104, a meeting participant may opt for a user interface that displays all meeting participants, arranged in a grid, whereas other meeting participants may opt for a user interface 106 that displays only the active speaker. Various other user interface arrangements are possible.

Most online meeting services provide additional collaboration tools to enhance the meeting experience. For example, some online meeting services provide content sharing or presentation tools. These tools or meeting features allow each meeting participant to share content that is being presented on his or her screen or display, or content associated with a specific software application executing on his or her computing device. In some instances, only one meeting participant is allowed to share content at a time, whereas in other instances, multiple meeting participants may be able to share content concurrently.

With the rise of remote work, the popularity and use of online meeting services has soared. As the total number of meetings that are conducted increases, the likelihood that any one person misses a meeting increases appreciably. Furthermore, with so many different meetings, it may be difficult to keep track of what occurred at one particular online meeting, versus what may have occurred at a different online meeting. Consequently, there is a growing need for techniques and tools that allow people, and particularly people who may have missed some, or all, of an online meeting, to obtain relevant information relating to what occurred during the online meeting.

To that end, some online meeting services provide the ability to automatically record an online meeting, so that the recording (e.g., a video file) can be played back later by someone who may have missed the meeting. Some online meeting services process the audio portion of a video stream by analyzing the audio and converting the spoken conversation that occurred during the meeting to a text-based transcript, using what is commonly referred to as a speech-to-text algorithm or model. The resulting text-based transcript generally identifies the speaker and may include the time at which each spoken message occurred. Additionally, if meeting participants exchange text-based messages via a chat or messaging feature, many online meeting services make this chat transcript available at the conclusion of the online meeting.

There are several problems with these approaches. First, with the approaches described above, there is no single source of information from which a person can gain a complete and accurate understanding of what occurred at the meeting. For example, if a person reviews the full video recording of the online meeting, that person will also need to review the chat transcript to ensure he or she does not miss some critical information. Second, reviewing the full video recording of an online meeting is an extremely time-consuming task. It is often the case that a person's information needs are represented by only some small portion of the total conversation that occurs during an online meeting, or a single slide or page in a multi-slide or multi-page content presentation. Therefore, more often than not, reviewing the entire recording of an online meeting is an extremely inefficient way of obtaining desired information. Third, reviewing a text-based transcript derived via a text-to-speech algorithm is also a time-consuming and inefficient task. A text-based transcript, by itself, is an incomplete representation of an online meeting. A text-based transcript lacks contextual information that may be critical to obtaining a complete and accurate understanding of what occurred during the online meeting. For example, if a meeting participant shared a content presentation (e.g., via a screen sharing or app sharing feature), the text-based transcript will not reflect any information from the shared content presentation. Moreover, the text-based transcript may lack other contextual information, such as non-verbal communications or cues, such as facial expressions, gestures, and body language of the meeting participants. These non-verbal communications can provide important insights into a meeting participants' emotions, intentions, agreement or disagreement, and overall engagement levels during an online meeting.

One potential new approach for generating summary information for an online meeting involves using a generative language model, such as a large language model (LLM). For example, the audio portion of a video can be processed using speech-to-text, to generate a text-based transcript that represents the conversation amongst meeting participants. Then, portions of the text might be used within a prompt that is provided as input to a generative language model, where the prompt is designed to serve as a question or instruction to generate a summary description of some portion of the online meeting. However, because the text-based transcript, derived from converting the audio of the spoken conversation to text is not a complete and accurate representation of the online meeting, the resulting text-based answers generated by the generative language model may be incomplete, inaccurate, or misleading. This is due at least in part because the input text is not a complete and accurate representation of the meeting. By way of example—if a first meeting participant asks a yes-or-no question, and several meeting participants nod their head (e.g., up and down)—a gesture that is widely interpreted to mean that a person is in agreement—because these gestures are not included in the text-based transcript, the generative language model may not generate the appropriate response to a particular prompt. In fact, the generative language model may generate a wholly inaccurate response, by suggesting that an answer to a specific question is "no" when in fact the answer is "yes." Accordingly, when a generative language model is provided with the text-based transcript, the generative language model may provide an inaccurate, incomplete or misleading summary description, owing to the fact that gestures made by multiple meeting participants are not reflected in the input text available to the generative language model.

Consistent with embodiments of the present invention, the aforementioned technical problems are solved by leveraging various machine learning and natural language processing techniques to generate a complete and accurate digital representation of an online meeting, from which accurate and complete summary descriptions of the online meeting are generated. A software-based media processing service receives and processes a combination of video streams—including a first type of video stream originating at a camera device of a meeting participant and generally depicting video images of a meeting participant, and a second type of video stream including shared content (e.g., as may be generated by a screen sharing or app sharing feature) that originates at the computing device of a meeting participant. Each video stream is independently analyzed using various pre-trained machine learning models of the media processing service to generate text. The text generated by the media processing service is then provided as input to a software-based meeting analyzer, which uses the text in various techniques to derive accurate insights as to what occurred during an online meeting.

Consistent with some embodiments, each video stream originating at a camera device of a meeting participant is received and processed by a first type of pre-trained machine learning model that converts the audio portion of the video stream, representing the spoken message of a meeting participant, to text. This type of machine learning model is generally referred to as a speech-to-text model. In addition, each video stream is also processed by one or more additional pre-trained machine learning models—specifically, one or more computer vision models—that identify or detect non-verbal communications made by a meeting participant. Consistent with some embodiments, these models may output text that describes or represents these non-verbal communications. With some embodiments, in addition to detecting and generating text to represent detected gestures, one or more pre-trained machine learning models may be used to detect or identify facial expressions. Similarly, one or more pre-trained machine learning models may be used to detect or identify emotions, or body language, expressed by a meeting participant. The output of these models is text that describes or otherwise represents the detected facial expression, emotion, or body language, along with timing data (e.g., a timestamp, or a combination of a beginning time and an ending time) for each detected non-verbal communication.

In addition to generating text from the video streams that originate from each meeting participant's camera device, video streams that contain shared content, for example, as a result of a meeting participant sharing his or her screen or sharing an application user interface, are also analyzed for the purpose of generating or extracting text. For example, a video stream that includes shared content may be processed by one or more pre-trained machine learning models to identify specific regions of interest that include collections of text. These collections of text are then further analyzed, with additional pre-trained machine learning models, to determine their layout or structure, so that relevant word groups can be extracted from the collections of text, while maintaining the structure and order of the relevant text.

As the various video streams are processed by the media processing service, the text that is output by the various machine learning models may be associated with timing data. Specifically, timing data for each detected non-verbal communication (e.g., head and hand gestures, body language, facial expressions, extracted word groups from shared content, etc.) may be generated and stored with the textual description of the non-verbal communication. This timing data may be expressed relative to a start time of a meeting, but may also be expressed using some other standard metric for measuring time, including for example, the actual time of the day. In this way, when an event or action (e.g., representing a non-verbal communication) as recorded in a video, is detected and results in the generating of a corresponding textual description, the time at which the event or action occurred is also captured. For example, if a gesture or other non-verbal communication is detected in a video stream, the machine learning model that identifies the non-verbal communication and generates a textual description of the non-verbal communication may also output timing data to indicate the time during the meeting when the non-verbal communication occurred. Accordingly, the textual descriptions of the various non-verbal communications that are detected by the one or more pre-trained machine learning models may be further processed to arrange the text and store the text in a data structure (e.g., a table of a database), so that the various textual elements may be recalled, queried, searched for, and so forth, based on the time at which the underlying action or event occurred. Consistent with some embodiments, the data generated from the one or more models may be stored in fields of a database table, where separate fields are used to store the textual description of the non-verbal communication, the source (e.g., person or meeting participant) of the detected non-verbal communication, and the time at which the non-verbal communication occurred. This improves the ability of the software based meeting analyzer to generate accurate and complete insights regarding online meetings.

In other instances, a text-based transcript (e.g., a text file) may be derived where each textual description of a nonverbal communication is stored in chronological order, based on when the corresponding non-verbal communication occurred, relative to other communication (e.g., a conversation, as represented by text generated via speech-to-text translation) that occurred during the meeting. Specifically, each textual element that has been derived or extracted from detecting or identifying a specific act or event is ordered or positioned relative to other textual elements, based on the time during the meeting at which the act or event occurred during the online meeting. Additionally, the text may be annotated or stored with meta-data, where the annotations or meta-data reflect not only a relevant time, but the source of the text—for example, the name of a meeting participant associated with the event or act from which the text was derived. With some embodiments, an annotated text-based transcript may be generated, where the text-based transcript includes all of the textual elements derived from the various sources, arranged chronologically to reflect the time during the meeting at which an event or act occurred, and from which a portion of text was derived. This arrangement of text may also include text extracted from a text-based chat that occurred during the online meeting, as facilitated by a chat service or messaging service that is an integral part of the online meeting service. The output of the media processing service is a data structure that is a text-based digital representation of an online meeting, derived from multiple data sources. This data structure may be stored temporarily in memory (e.g., a random-access memory) or more permanently by writing the data structure to a non-volatile storage device as a text-based file, which may be referred to as a text-based, annotated transcript. In any case, this text-based digital representation of the online meeting is provided as input to a software-based meeting analyzer service.

With some embodiments, the timing data may also include timecode data for the video, which may allow for synchronizing the actual time that an event occurred, with the portion of the video file that depicts the non-verbal communication. Accordingly, if the meeting analyzer service provides a textual description as a response to a query, the text-based response may also include a link to one or more relevant portions of the actual video file from which the answer to the end-user's query was derived. This way, the end-user can verify certain information by quickly and efficiently reviewing portions of video (e.g., video clips) relevant to a particular answer or reply that has been derived based on a default or custom end-user query.

Consistent with some embodiments, the meeting analyzer service uses the text-based digital representation of the online meeting with a generative language model, such as a large language model ("LLM"), to generate accurate and complete summary descriptions of the online meeting. A generative language model is a sophisticated artificial intelligence system that can understand and generate human-like text. The model is trained on large datasets of text to learn grammar, semantics, and contextual relationships. When used for providing summary descriptions, and summary descriptions of an online meeting in particular, these models can analyze and condense a portion of text into a concise and coherent summary while preserving the key information. By leveraging the ability of these models to generate language, a generative language model enables efficient and accurate summarization of an online meeting. By providing to the generative language model a text-based representation that is a complete and accurate representation of what occurred during an online meeting, the summary descriptions generated by the generative language model are generally improved—that is, more accurate and more complete.

The textual elements representing the online meeting may be used in a number of ways to generate accurate summary descriptions of the online meeting. First, consistent with some embodiments, various portions of text may be selected for inclusion in a prompt that is provided as input to the generative language model. For example, in some cases, one or more prompt templates may be developed, such that a prompt template may be injected with additional text extracted or selected from the text representing the online meeting. In some instances, the text may be formatted in the form of an annotated transcript, such that text may be selected in various ways. For example, text may be selected based on a time range, by speaker, by source, and so forth.

In another example, the text that represents the online meeting may be provided as context, or preceding context. For example, any text-based input that is provided as input to a generative language model may be referred to generally as context, where context provided prior to the prompt may be referred to specifically as preceding context. Accordingly, consistent with some examples, the entire text representing the online meeting may be provided as preceding context, for any of a number of prompts.

Finally, in a third scenario, some portion of text representing the online meeting may be used in a post processing operation, for example, to confirm or verify that an output (e.g., a summary description) generated by the generative language model is accurate. For example, the text that represents the answer generated by the generative language model may be subject to a verification process, which uses information from a text-based transcript to confirm or verify a specific answer, prior to displaying or presenting an answer. As such, having an accurate and complete text-based representation of the online meeting may help to prevent the generative language model from the phenomenon commonly referred to as hallucinating.

One of the several advantages of the approach described herein is more complete and more accurate summary descriptions of an online meeting, as generated by the generative language model. This advantage is achieved through technical means by deriving or generating text from non-verbal communications and accurately extracting text from shared content. Because the resulting text is a more complete and accurate digital representation of the online meeting, the text that is provided as input to the generative language model, whether it be as a prompt or as additional context with a prompt, allows the generative language model to provide or generate more complete and more accurate summary descriptions of the online meeting. Other aspects and advantages of the present subject matter will be readily apparent to those skilled in the art from the descriptions of the several figures that follow.

Figure 2:
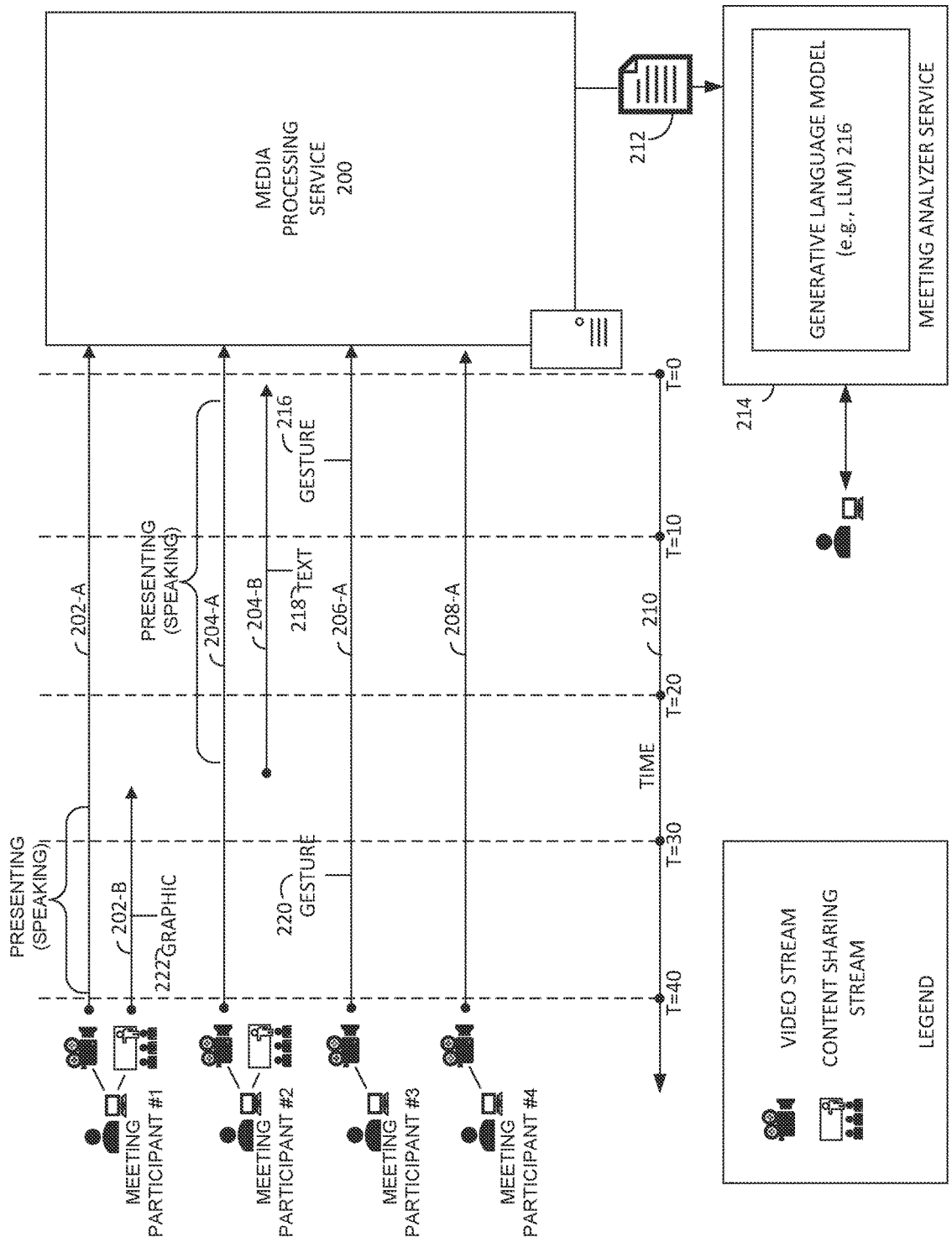
FIG. 2 is a diagram illustrating how a media processing service of an online meeting service receives and processes a combination of video and content sharing streams, to generate text for use as an input to a generative language model, and more specifically to derive summary descriptions of an online meeting, according to some embodiments.

FIG. 2 is a diagram illustrating how a media processing service 200 of an online meeting service receives and processes various video streams generated during an online meeting. In this example, the online meeting has four meeting participants, each of which is broadcasting a video stream. Consistent with some embodiments, each video stream represents one of two types of video streams. A first type of video stream is a video stream generated using a video camera device of a client computing device executing the client software application for the online meeting service. Generally, this first type of video stream will depict a video image of a meeting participant. In FIG. 2, the lines with reference numbers 202-A, 204-A, 206-A, and 208-A, each represent a live video stream being communicated from a video camera of a meeting participant's client computing device to the media processing service 200, over time. A second type of video stream, referred to herein as a content sharing stream, is a video stream that represents content that a meeting participant is sharing with other meeting participants via the online meeting service. A content sharing stream originates at a client computing device of a meeting participant, but not via a video camera. Instead, a content sharing stream originates when a meeting participant shares content by sharing an application user interface, or sharing his or her screen, or some portion thereof. In this example, the lines with reference numbers 202-B and 204-B represent content sharing streams for content shared by the first and second meeting participants, respectively. For instance, in this example, during the online meeting, the second participant (e.g., "MEETING PARTICIPANT #2) shared content with other meeting participants, as evidenced by the line with reference 204-B. After the second meeting participant sharing or presenting content, the first meeting participant (e.g., MEETING PARTICIPANT #1) shared content with others, as evidenced by the line with reference number 202-B.

As shown in FIG. 2, the passing of time is represented by the timeline with reference number 210. Accordingly, as shown by the timeline 210, the right most portion of each line representing a video stream (e.g., 202-A, 202-B, 204-A, 204-B, and so on) corresponds with time, T=0, whereas the left most portion of each line represents the current time. So, for example, assuming for purposes of this example that T is measured in minutes, the right portion of each line, at time T=0, represents the very beginning of the online meeting, whereas the left portion of each line, at time T=40, represents the passage of forty minutes from the beginning of the online meeting. Accordingly moving from right to left represents the passing of time.

Consistent with some embodiments, as each video stream is received at the media processing service 200, each video stream is processed by the media processing service 200 to generate text. Specifically, the audio portion of each video stream of the first type is processed using a speech-to-text algorithm or model to derive text representing the spoken message from each meeting participant. Additionally, the video portion of each video stream of the first type is also processed using various pre-trained computer vision algorithms or models to detect or identify non-verbal communications made by a meeting participant, including gestures, facial expressions, emotions, and in some instances, body language. The output of these computer vision algorithms or models is text, describing or otherwise representing the identified non-verbal communication. With some embodiments, each textual element is associated with meta-data indicating the time during the online meeting at which a non-verbal communication occurred, where the non-verbal communication is the act or event from which text was derived. Similarly, meta-data will be associated with each textual element to indicate the source, for example, the specific meeting participant from which the text was derived.

Each video stream of the second type—that is, each content sharing stream—is also processed using various computer vision algorithms or models to identify and extract text and graphics. For example, a content sharing stream is analyzed with a pre-trained object detection algorithm to identify regions of interest that depict text, or graphics. When a region of interest depicting text is identified, the text is processed further with a layout analysis algorithm or model to identify the layout or structure of the text. Using the identified layout and structure, word groups are then extracted from the content. For example, an optical character recognition (OCR) algorithm may be applied to each identified structured collection of text to extract the actual word group. Here, each word group is a collection of text extracted from the content, where the ordering and grouping of the individual words is preserved via the analysis of the text layout and structure. The media processing service 200 is described in greater detail below, in connection with the description of FIG. 8.

The media processing service 200 processes each video stream independently, and then combines the output (e.g., text) of the various analyses, to generate a complete and accurate, text-based representation of the online meeting. With some embodiments, this digital representation of the online meeting is a text-based transcript 212, where each textual element inserted into the text-based transcript is positioned chronologically, based on the time during the online meeting at which the specific action or event, from which the text was derived, occurred. Each textual element may be annotated as entered in the transcript to identify the time during the online meeting at which the specific action or event, from which the text was derived, occurred. Similarly, the source of the text—that is, the identity of the meeting participant from which the text was generated—may also be provided as an annotation with each textual element.

As shown in FIG. 2, the text-based transcript 212 for the online meeting is provided, as input, to a meeting analyzer service 214. The meeting analyzer service 214 leverages a generative language model 216 to generate summary descriptions of the online meeting, based in part on the text-based transcript 212. The summary descriptions for the online meeting may be derived in a variety of different ways.

The operation of the meeting analyzer service 214 is described in greater detail below, in connection with the description of FIG. 9.

Consistent with the example presented in FIG. 2, when the online meeting begins (e.g., at time, T=0), all four meeting participants are broadcasting a live video stream, as represented by the lines 202-A, 204-A, 206-A, and 208-A. Shortly after the online meeting begins, the second meeting participant (e.g., MEETING PARTICIPANT #2) begins sharing a content stream, as represented by the line with reference number 204-B. As the second meeting participant is sharing content, the second meeting participant is speaking, for example, to explain, describe or discuss the content that the meeting participant is sharing. At some point, the second meeting participant asks a question or makes a statement, and the third meeting participant (e.g., MEETING PARTICIPANT #3) nods his head, for example, in an up-and-down motion, to convey to all meeting participants that he or she is in agreement with a statement that was made by the second meeting participant. The detected head nod is represented in FIG. 2 by the label, "GESTURE" with reference number 216. An example of a user interface for an online meeting, showing a meeting participant nodding his head, is shown in FIG. 3.

Figure 3:
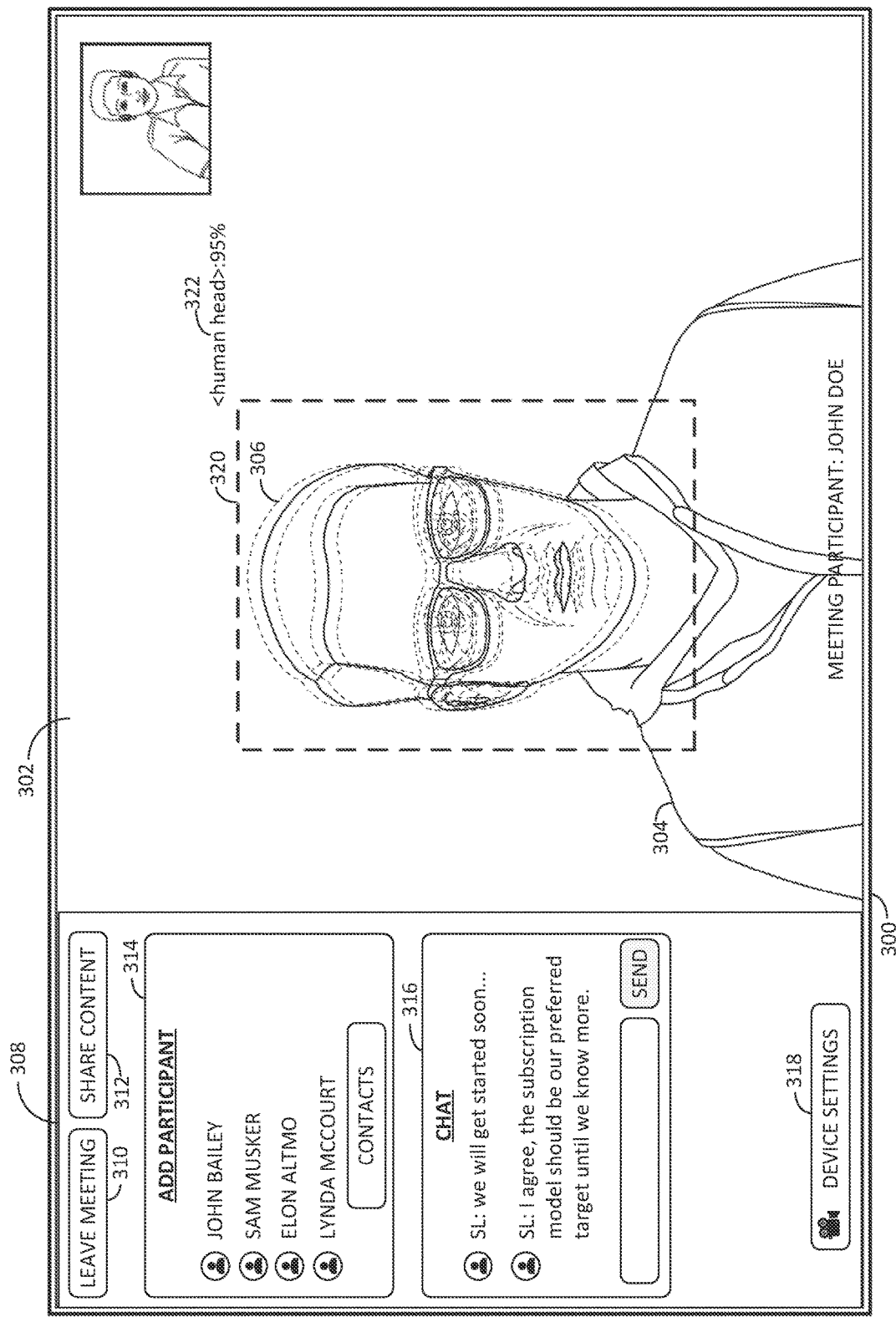
FIG. 3 is a diagram illustrating an example of a user interface for a client application for an online meeting service, where the user interface is presenting a live video stream of a meeting participant performing a first gesture (e.g., a head-nod gesture), consistent with embodiments of the present invention.

FIG. 3 is a diagram illustrating an example of a user interface 300 for a client software application, for an online meeting service, where the user interface is presenting a live video stream 302 depicting a meeting participant 304 performing a first gesture (e.g., a head-nod gesture) 306, consistent with embodiments of the present invention. The user interface 300 includes two primary component parts. The first component part is a control panel 308 that provides a variety of meeting control elements, for example, such as a first button (e.g., "LEAVE MEETING") 310 that, w % ben selected, will remove the meeting participant from the online meeting, and a second button (e.g., "SHARE CONTENT") 312 that, when selected, will provide the meeting participant with various options for sharing content. For example, the meeting participant may opt to share content that is being presented on a display (e.g., screen sharing), or content associated with a specific application (e.g., app sharing). The control panel 308 portion of the user interface 300 includes additional control elements, such as a contact list 314 from which meeting participants can be selected and added to the online meeting. The control panel 308 also includes a chat window 316 providing text-based chat functionality. Finally, the control panel includes a button (e.g., "DEVICE SETTINGS") that allows the meeting participant to select and configure various input and output devices (e.g., a microphone, speakers, camera, display, etc.) that are to be used with the software application.

In this example, the bounding box 320 and the annotation (e.g., "<human head>:95%") 322 are shown only to convey how various computer vision algorithms or pre-trained models may operate to identify a gesture that is made by a meeting participant. The bounding box 320 and annotation 322 are not actually displayed as part of the user interface 300 that is presented to the meeting participant. Instead, in this example, the bounding box 320 represents the region of interest that has been detected by an object detection algorithm. In this case, the object detection algorithm has detected the head of the meeting participant, within the region of interest identified by the bounding box 320. The annotation 322 indicates the object that has been detected—a human head—and the number ("95%") represents a confidence score indicating how likely the detected object is what has been indicated by the annotation. Consistent with some embodiments, the output of the object detection algorithm—specifically, the coordinates identifying the position of the region of interest, a class label similar to the annotation 320 indicating the class of object identified, and a confidence score—will be provided to a second algorithm or model as inputs. Specifically, the output of the object detection algorithm or model is provided as input to a gesture detection algorithm. The gesture detection algorithm processes the portion of video identified by the coordinates of the bounding box 320, to identify gestures that may be made by the meeting participant. In this example, the gesture detection algorithm or model detects that the meeting participant has performed a gesture by nodding his head, for example, in an up-and-down motion, as shown in FIG. 3. With some embodiments, the gesture detection algorithm may be trained to generate text describing specifically the gesture that has been detected. This type of machine learning model may be referred to as a gesture-to-text detection model. In other examples, a gesture detection algorithm or model may simply identify a gesture, for example as a class of gesture. In this case, additional post processing logic may be applied to map the detected or identified gesture to a text-based description of the gesture.

Referring again to FIG. 2, shortly after the third meeting participant performs the head-nod gesture, just after time T=10, the second meeting participant who is sharing content, as represented by the line with reference 204-B, shares a slide of a presentation that includes text. The media processing service 200, in processing the shared content stream 204-B detects the text and generates a textual element for inclusion in the final output (e.g., a text-based transcript). An example of a user interface sharing content in which text is detected is shown in FIG. 4.

Figure 4:
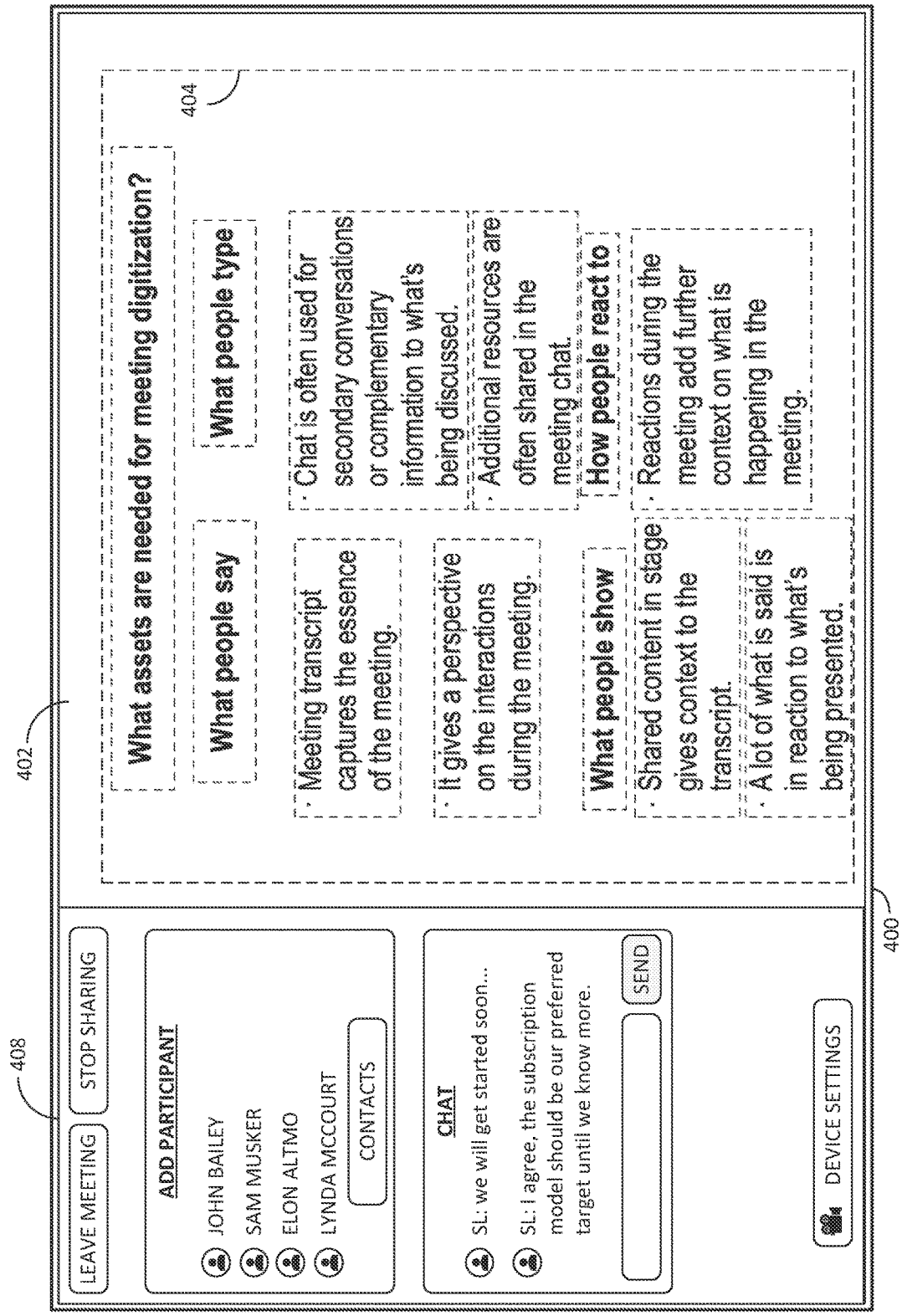
FIG. 4 is a diagram illustrating an example of a user interface for a client application for an online meeting service, where the user interface is presenting shared content (e.g., a content presentation), and specifically a first slide or page of a presentation, consistent with embodiments of the present invention.

FIG. 4 is a diagram illustrating an example of a user interface 400 for a client application for an online meeting service, where the user interface 400 is presenting a content sharing stream 402, and specifically a slide or page of a presentation that includes text. As shown in FIG. 4, the user interface 400 includes two primary components—the content sharing panel 402, in which the shared content is being presented, and a control panel 408, showing various control elements for the online meeting application.

With some embodiments, the content sharing stream is analyzed using an object detection algorithm or model. The object detection algorithm or model is trained to identify regions of interest—specifically, portions of the user interface 400 that include text being shared as part of a content sharing stream or presentation. Here, in this example, the output of the object detection algorithm is represented by the bounding box with reference number 404. The bounding box 404 is illustrated here, for the purpose of conveying an understanding of the computer vision algorithms or models and would not actually be present in a user interface shown to a meeting participant. In any case, with some embodiments, the object detection algorithm or model is trained to identify text that is being shared via the content sharing feature of the online meeting service. More specifically, the model is trained to ignore, or exclude from detecting, those portions of each video frame of the shared video stream that represent the user interface portion of the online meeting application, or the user interface of the specific application from which the content is being shared. For example, if a document editor application or a slide editor and presentation application is used to share content, some portion of the content that is actually shared may represent the user interface of the application, as opposed to the actual content that the meeting participant intends to share. The object detection algorithm may be trained to identify only the content that the meeting participant intends to share, and to exclude from detection any text or graphic that is part of the actual user interface of the application used to present the content. As shown in FIG. 4, the bounding box 404 has identified the location within the user interface 400 of the text that is being shared.

As shown in FIG. 4, the output of the object detection algorithm or model is provided as an input to a layout analysis algorithm or model. The layout analysis algorithm or model is trained to identify the structure or layout of the text, so that word groups can be extracted without mixing text from individual collections of groups of text. Here, each word group is shown with its own bounding box to indicate the output of the layout analysis algorithm or model. Once the structure or layout of the text has been determined, an optical character recognition (OCR) algorithm may be used to recognize the characters, and ultimately extract the text. As described below and shown in connection with FIG. 7, each textual element may be added to a text-based transcript, annotated to indicate the time the text was presented, and the meeting participant who shared the content that included the text.

Referring again to FIG. 2, as the online meeting continues, shortly before time T=30, the first meeting participant (e.g., MEETING PARTICIPANT #1) begins a second content sharing presentation 202-B and begins discussing the shared content that he or she is presenting. During the content sharing presentation, the third meeting participant (e.g., MEETING PARTICIPANT #3) makes a gesture 220 that is detected in the video stream 206-A. An example of the detected gesture is shown and described in connection with FIG. 5.

Figure 5:
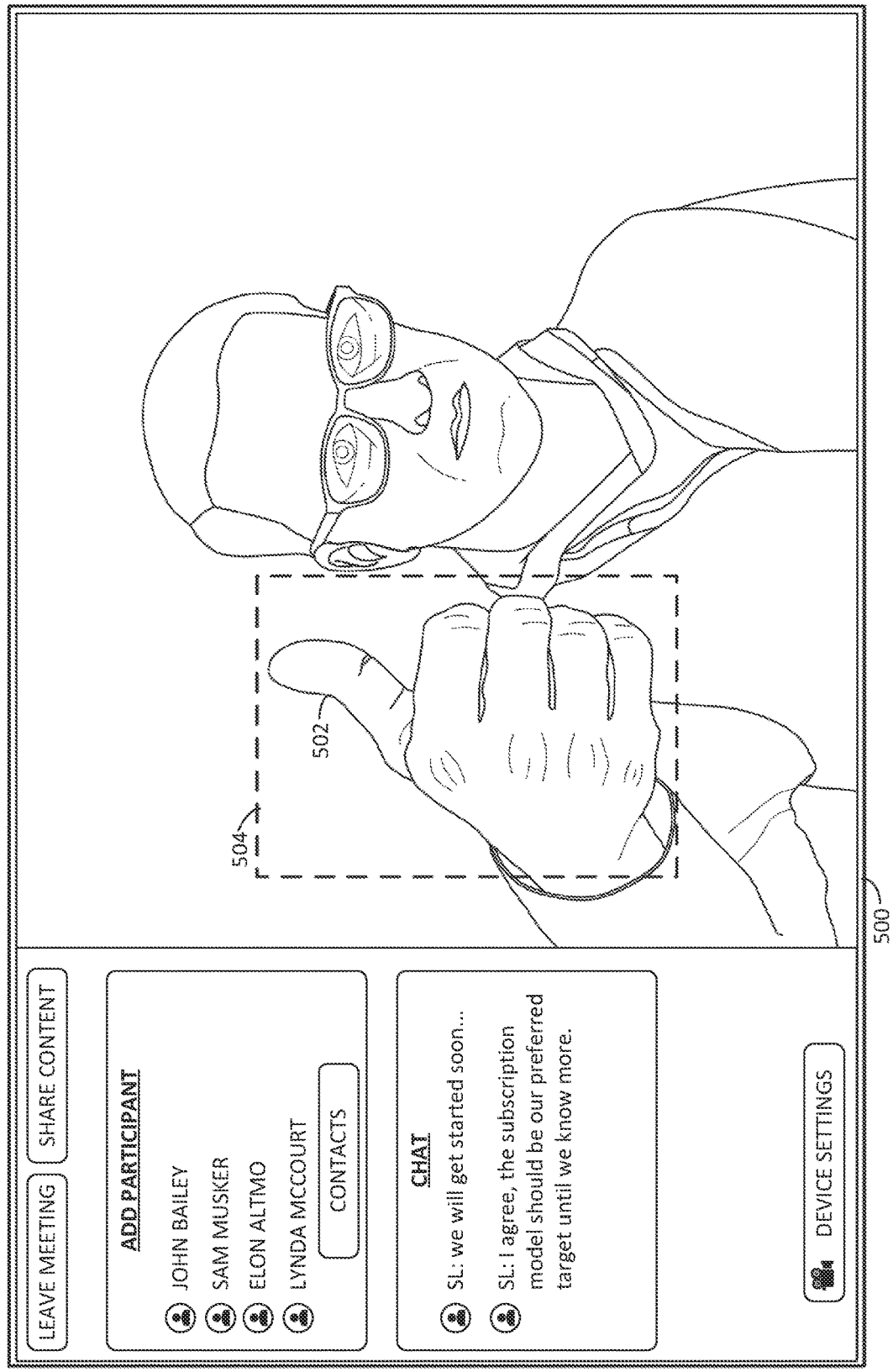
FIG. 5 is a diagram illustrating an example of a user interface for a client application for an online meeting service, where the user interface is presenting a live video stream of a meeting participant performing a second gesture (e.g., a thumbs-up gesture), consistent with embodiments of the present invention.

FIG. 5 is a diagram illustrating an example of a user interface 500 for a client application for an online meeting service, where the user interface 500 is presenting alive video stream of a meeting participant performing a second gesture (e.g., a thumbs-up gesture) 502, consistent with embodiments of the present invention. In this example, the object detection algorithm or model has identified a human hand within the bounding box or region of interest 504, and the gesture detection algorithm or model has identified a hand gesture, specifically a gesture commonly referred to as a "thumbs-up" gesture 502, indicating that the meeting participant has expressed agreement or given an affirmative response to something that was said during the online meeting. As with the gesture shown in FIG. 3, a textual description of the hand gesture 502 will be output and added to a text-based transcript for subsequent input to the meeting analyzer service.

Referring again to FIG. 2, as the first meeting participant is sharing content 202-B, the first meeting participant shares a slide or a page of a presentation that includes a combination of text and graphics 222, which are detected by the media processing service 200. An example of such a content sharing user interface is presented in FIG. 6.

Figure 6:
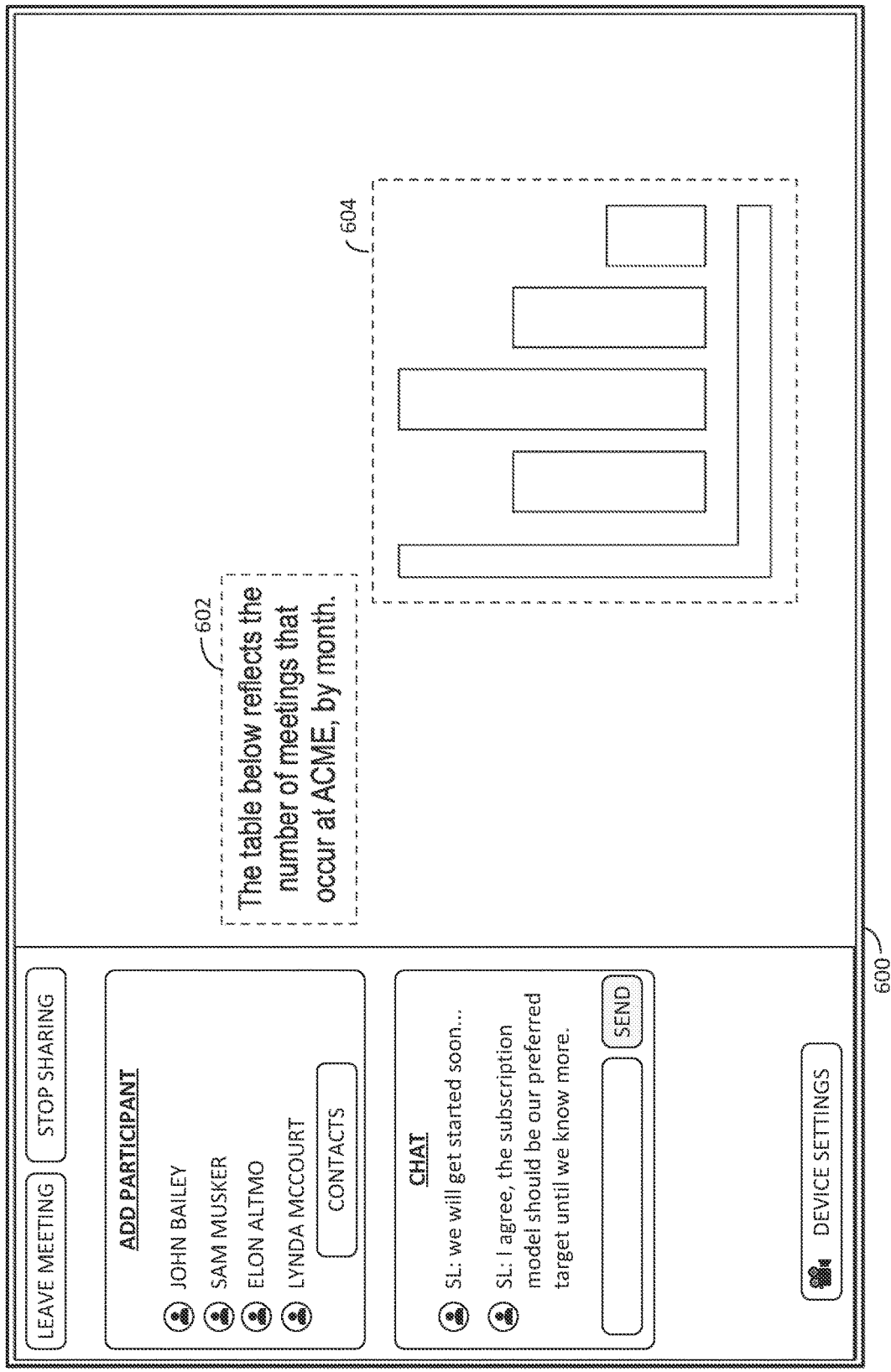
FIG. 6 is a diagram illustrating an example of a user interface for a client application for an online meeting service, where the user interface is presenting a content sharing stream, and specifically a second slide or page of a presentation, consistent with embodiments of the present invention.

FIG. 6 is a diagram illustrating an example of a user interface 600 for a client application for an online meeting service, where the user interface 600 is presenting a content sharing stream, and specifically a slide or page of a presentation that includes a combination of text and graphics, consistent with embodiments of the present invention. In this example, the content that is being shared includes both text 602 and a graphic 604. The text 602 is processed in the same manner as described in connection with the text in FIG. 4. However, in this example, the object detection algorithm or model has identified a graphic 604. With some embodiments, a graphic may be analyzed by one or more pre-trained machine learning models, which generate one or more tags or class labels for the graphic. The graphic is then captured, tagged, and stored for subsequent recall. For example, the meeting analyzer may present a link to the graphic, so that in the context of a particular summary description of the online meeting, a meeting participant may simply select a link to view the graphic.

FIG. 7 is a diagram illustrating an example of a portion of an annotated text-based transcript for an online meeting, as generated by a media processing service and including text describing non-verbal communications and word groups extracted from presentations, consistent with embodiments of the present invention. Consistent with some embodiments, the output of the media processing service is a file that includes a text-based transcript with multiple textual elements. With some embodiments, each text-based element may be annotated, for example, by including with the text various meta-data elements, such as a data indicating a source from which the text was derived, as well as data indicating the time during the online meeting when an act or event occurred, where the derived text is associated with the act or event. Furthermore, the textual elements are inserted and ordered in the transcript chronologically.

For example, as shown in FIG. 7, the text element with reference number 702 represents the output generated from converting recorded audio to text, using a speech-to-text algorithm or model. In this example, the recorded audio was associated with the video stream from the first meeting participant (e.g., MEETING PARTICIPANT #1). The information that precedes the actual text as shown in the transcript 700 includes information indicating the time at which the spoken message was recorded, an identifier for the meeting participant, and a name of the meeting participant.

As shown with reference number 704, a textual description has been entered into the transcript for a gesture that was detected. Here again, the time and source of the detected gesture are provided as an annotation (e.g., meta-data) in the text-based transcript. In this example, the gesture-to-text detection algorithm or model has output the text describing the detected gesture, including the name of the participant associated with the video stream in which the gesture was detected. In another example, the text element with reference 710 is a textual description of a hand gesture detected in a video stream.

As shown with reference numbers 706 and 708, various textual elements associated with a content sharing presentation have been added to the transcript. For example, the annotation or meta-data with reference number 706 indicates that text was identified during a screen sharing session during the online meeting. As shown in FIG. 7, the time at which the text was detected is shown. However, in some alternative embodiments, an annotation may indicate the duration of time the content or text was presented. After the annotation or meta-data, the actual extracted text 708 from the presentation is presented in the transcript.

As shown in FIG. 7, with some embodiments the output of the media processing service may be a single text-based file where the text is arranged as a transcript. However, consistent with some alternative embodiments, each text element may be stored as a structured object, such as a list or an array, where the elements might include a first element for the text itself, a second element for a timestamp, and a third element to identify the source of the text.

Figure 8:
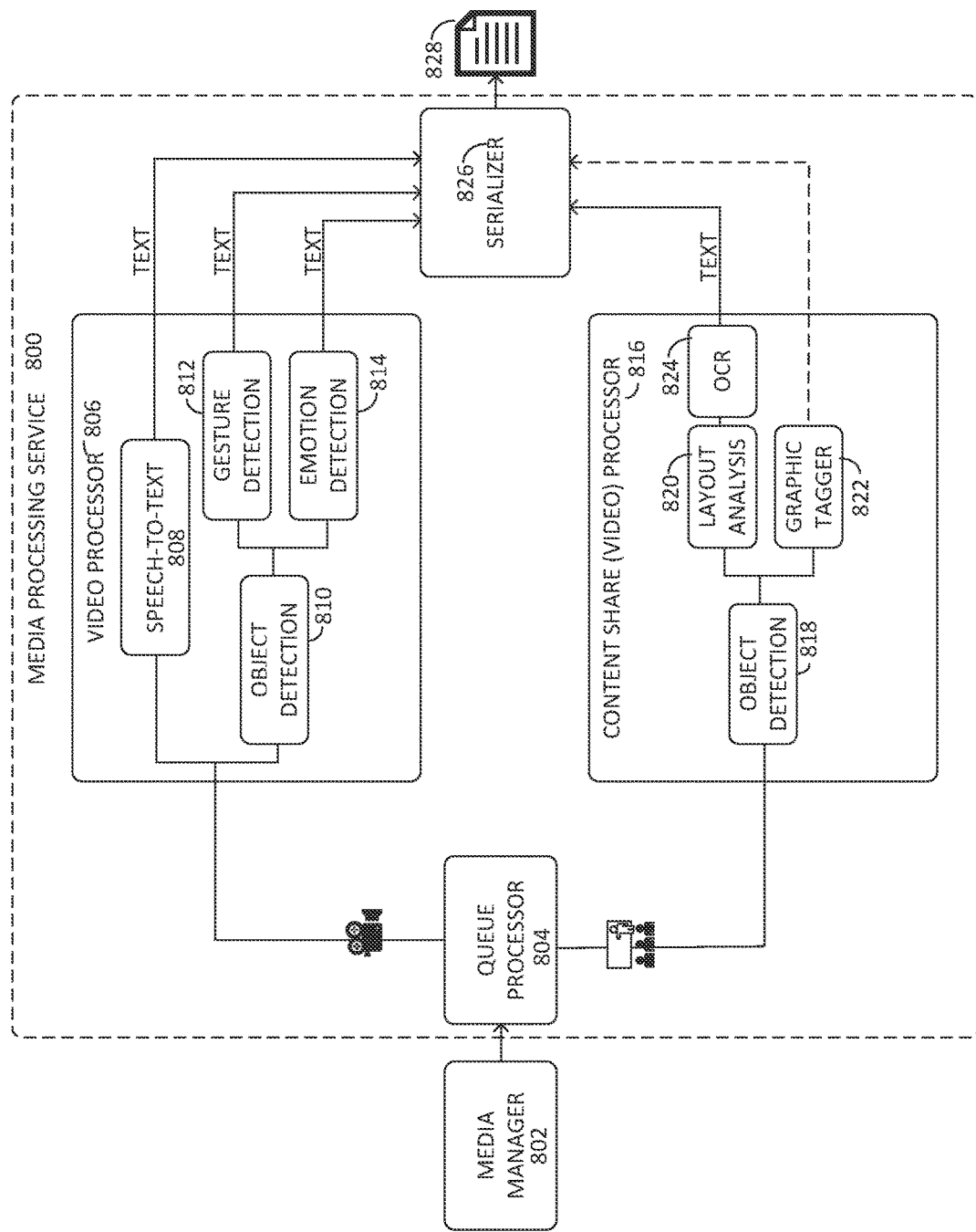
FIG. 8 is a block diagram illustrating an example of the functional components that comprise a media processing service of an online meeting service, consistent with some embodiments.

FIG. 8 is a block diagram illustrating an example of the functional components that comprise a media processing service of an online meeting service, consistent with some embodiments. As shown in FIG. 8, the media manager 802 is a component of the online meeting service that redirects the various incoming video streams to a queue processor 804. The queue processor 802 receives each video stream, and temporarily stores the incoming data as a video file.

The media processing service 800 has two primary components. The first component—referred to in FIG. 8 as the video processor 806—is for processing video that originates from a video camera of a computing device of a meeting participant. As shown in FIG. 8, the video processor 806 will process each video file in parallel processing paths. For example, each video file is processed by a speech-to-text algorithm or model 808 to convert spoken audio messages to text. Concurrently, each video file is also processed by an object detection algorithm 810 to detect objects within the individual frames of the video that may be associated with non-verbal communications. For example, the object detection algorithm or model may detect the face, head, hands, and/or body of a human—that is, a meeting participant depicted in the video. The output of the object detection algorithm or model 810 generally includes coordinates defining a region of interest or a bounding box for a detected object, along with a class label for the detected object. The output of the object detection algorithm or model is then provided as an input to a downstream algorithm or model. In some cases, the specific algorithm or model that is invoked may depend upon the class of object that was detected.

For example, as shown in FIG. 8, two downstream machine learning algorithms or models are shown—a first model 812 for identifying or detecting gestures, and a second model 814 for identifying or detecting emotions. Of course, in various alternative embodiments, the functionality of the two models may be combined into a single model, or similarly, there may be multiple additional models beyond the two depicted in FIG. 8. In this example, when the object detection algorithm or model 810 detects an object such as a human head or hand, the output of the object detection algorithm or model is provided as input to the gesture detection algorithm or model 812. The gesture detection algorithm or model 812 then analyzes the region of interest defined by the bounding box where the object was detected, for purposes of identifying or detecting a gesture, which may be a hand gesture, where the detected object is a hand, or a head gesture, where the detected object was a human head. Of course, in various alternative embodiments, other objects and gestures may be detected. For example, with some embodiments, a detected object may be the body, and the gesture may be a shoulder shrug, or some other detectable body gesture or body language. With some embodiments, when a human face is detected by the object detection algorithm or model 810, the relevant region of interest may be analyzed by a model trained to detect or identify emotions, such as the emotion detection algorithm or model 814.

Consistent with some embodiments, the downstream models 812 and 814 may be trained to output a textual description of what has been detected. For example, with some embodiments, each model may be trained using a supervised training technique, where the training data includes large amounts of annotated video data, where the annotations are textual descriptions of what is depicted in the video. Accordingly, each model may be trained to identify certain gestures, facial expressions, body language, and so forth, and generate a textual description of the behavior or act that has been detected. However, in other embodiments, one or more of the downstream models may be trained as a classified, which simply outputs a class label corresponding to the act or behavior that has been detected.

For instance, instead of generating a textual description of a thumbs-up hand gesture, the output of a model may simply be a label or similar identifier indicating the specific type of gesture that was detected—for example, a thumbs-up gesture. In this case, some post processing logic may be used to map the detected gesture to a textual description. For instance, the post processing logic may use a templated description that references the source of the gesture (e.g., the name of the meeting participant) and perhaps the time the gesture was detected, as well as other information relating to the context of the meeting. Accordingly, a detected hand gesture may result in a detailed description using text, such as, "After John Doe made a statement, Jill Smith expressed agreement by giving a thumbs-up gesture . . . "

The second primary component of the media processing service 800 is a content share processor 816. Whereas the video processor 806 processes video that originated at a camera device, the content share processor 816 processes video files that are generated as a result of a meeting participant using a content sharing tool or feature of the online meeting service. The content share processor 816 includes an object detection algorithm or model 818 that is trained to identify or detect text, figures, graphics, pictures, and so forth. With some embodiments, the object detection algorithm or model 818 is specifically trained to ignore those portions of a video frame that depict a user interface of an application that is being used to share content, whether the application is a content editing application, or the user interface of the online meeting application itself. When the object detection algorithm 818 detects shared text, the output of the object detection algorithm or model 818 is provided as input to a layout analysis algorithm or model 820. The layout analysis algorithm or model 820 is trained to identify the structure of the textual elements included in the region of interest identified by the object detection algorithm. By way of example, if the layout analysis algorithm or model detects text that is formatted in columns, the detected structure of the text can be used to ensure that when the text is extracted via the optical character recognition (OCR) 822 processing, the text that is associated with each column is kept together, as opposed to being mixed incorrectly.

When the object detection algorithm 818 detects a figure, graphic, or picture, the coordinates identifying the region of interest where the object was detected are passed to a graphic tagger 822. The graphic tagger will analyze the region of interest to generate a label or a tag that identifies the object that was detected, and generate an image (e.g., a snippet) of the detected object. The image and associated tag(s) are then stored with meta-data indicating the source and time, allowing the meeting asset to be linked to and subsequently recalled by the meeting analyzer service.

As shown in FIG. 8, the various outputs—for example, annotated textual elements—of the video processor 806 and the content share processor 816 are provided as inputs to a serializer 826, which temporarily stores the data before generating the final output in the form of an annotated, text-based transcript 828. Although not shown in FIG. 8, the serializer 826 may also receive as input the text that is part of a text-based chat session that is facilitated by the online meeting service and occurs during the online meeting. The individual text-based messages from the chat session may be inserted, chronologically, into the text-based transcript with all of the other textual elements from the various different sources. Accordingly, the final result of the media processing service 800 is a text-based, complete and accurate representation of what occurred during an online meeting.

Figure 9:
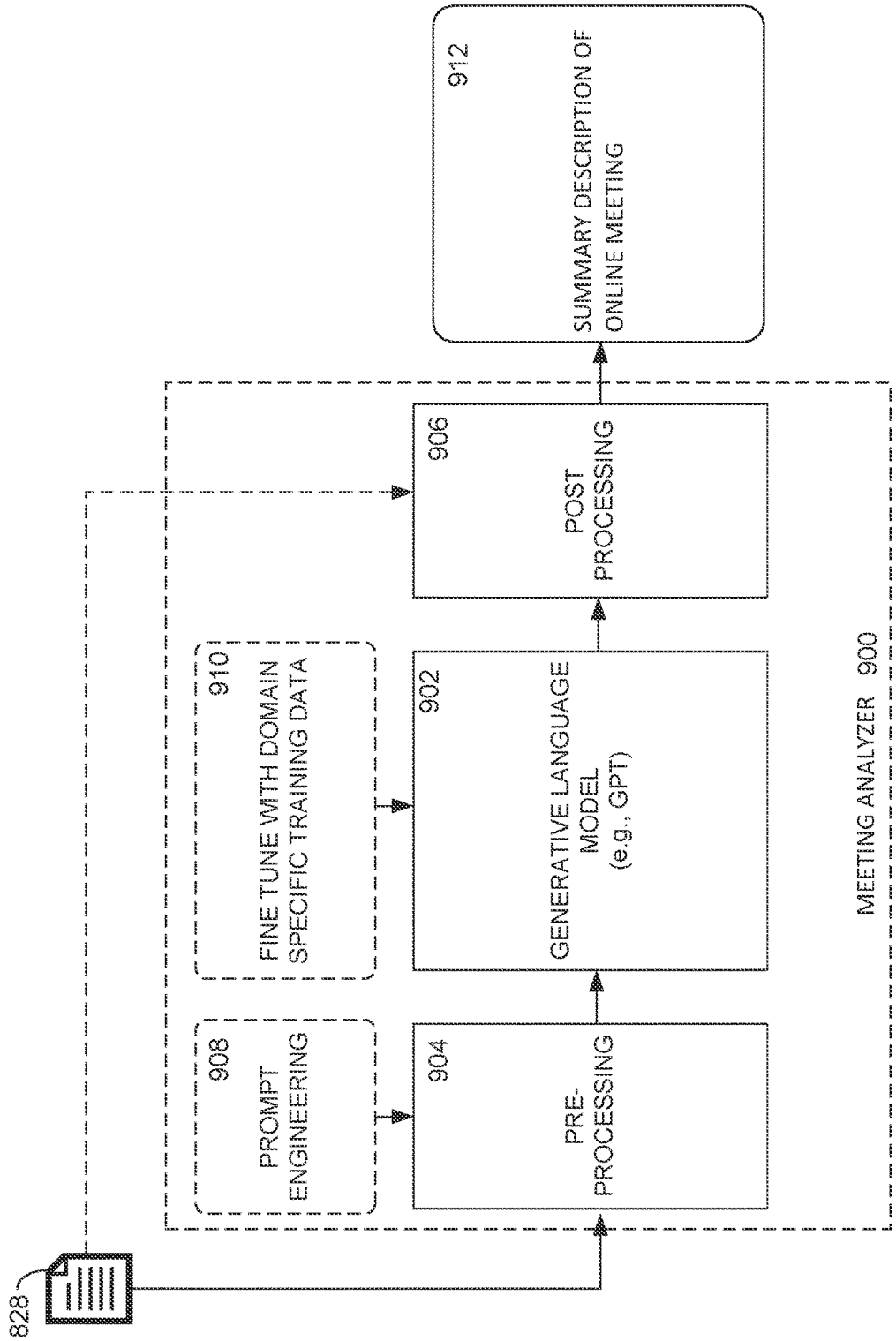
FIG. 9 is a diagram illustrating an example of various functional components for an online meeting analyzer, which includes at least one generative AI model, such as a general language model, for generating summary descriptions of online meetings, consistent with some embodiments.

FIG. 9 is a diagram illustrating an example of various functional components for an online meeting analyzer 900, which includes at least one generative language model 902, such as a large language model (LLM), for generating summary descriptions of online meetings, consistent with some embodiments. The generative language model may use a generative pre-trained transformer (GPT) and be pre-trained on a large dataset, and then fine-tuned 910 with data specific to online meetings.

As shown in FIG. 9, the meeting analyzer 900 includes pre-processing logic 904 and post-processing logic 906. In addition, as evidenced by the dashed boxes 908 and 910, with some embodiments, prompts or prompt templates may be derived through prompt engineering 908, and the model 902 may be fine-tuned through a supervised tuning process that involves training data specific to online meetings.

In general, the text-based transcript 828 of an online meeting may be used in generating a prompt, as part of the pre-processing stage. For example, the pre-processing logic 904 may include rules or instructions for extracting portions of the text from the text-based transcript to generate one or more prompts, which can then be provided as an input to the model 902. With some embodiments, a user interface (not shown) for the meeting analyzer service 900 provides an end-user with the ability to simply select one or more graphical user interface elements (e.g., buttons) to invoke a prompt. The output from the model 902 may be processed with post-processing logic 906 prior to being presented to the end-user. For example, with some embodiments, some portion of text from the text-based transcript 828 may be provided to the post-processing logic in order to verify an answer generated by the model for a specific prompt.

In addition to using the text of the text-based transcript to generate prompts, with some embodiments, various prompts may reference the text of the transcript 828, or a portion thereof, such that the text from the transcript is provided as pre-prompt context for generating an output by the model 902.

In addition to generating summary descriptions of an online meeting, the meeting analyzer service may provide a wide variety of other features and functions. Specifically, with some embodiments, the digital representation of the online meeting may be processed using the generative language model to identify and automatically formulate action items that are assigned to meeting participants, or others. For example, one or more prompts may be constructed to identify action items based on the digital representation of the online meeting. One or more prompts may be constructed to identify people who communicated specific knowledge or subject matter, and so forth.

In comparison with prior techniques for generating summary descriptions for an online meeting, the generative language model 902 is less likely to generate erroneous results, because the input to the model 902 is more accurate and more complete, as a result of the processing that is done by the media processing service. By way of example, because the digital representation of the online meeting includes textual descriptions of various non-verbal communications, along with timing data to indicate when those non-verbal communications occurred, the meeting analyzer service can infer answers to various questions that may otherwise not be possible. By way of example, consider a scenario where a first meeting participant is sharing content via the online meeting collaboration tool (e.g., a screen or app sharing feature), and conversing on subject matter that is presented via the shared content. The first meeting participant may ask a question related to the content that is being shared, while one or more other meeting participants may communicate agreement, or disagreement, with the presenter (e.g., the first meeting participant) by making a non-verbal communication, such as a hand or head gesture. Consistent with embodiments of the present invention, because the verbal and non-verbal communications are captured and represented in the digital representation of the online meeting, the meeting analyzer service can generate answers to various questions that are accurate, based on the textual descriptions and timestamps associated with non-verbal communications. For example, a person who was unable to attend the meeting may submit a query asking if Jane Doe (meeting participant #3) was in agreement with John Baily (meeting participant #1) when John presented the 2024 budget or financial plan. If Jane Doe was detected making a thumbs-up gesture at a time during the meeting when John Baily was presenting the budget or financial plan, the textual description of the non-verbal communication will allow the meeting analyzer service to generate an accurate answer to the query.

Machine and Software Architecture

Figure 10:
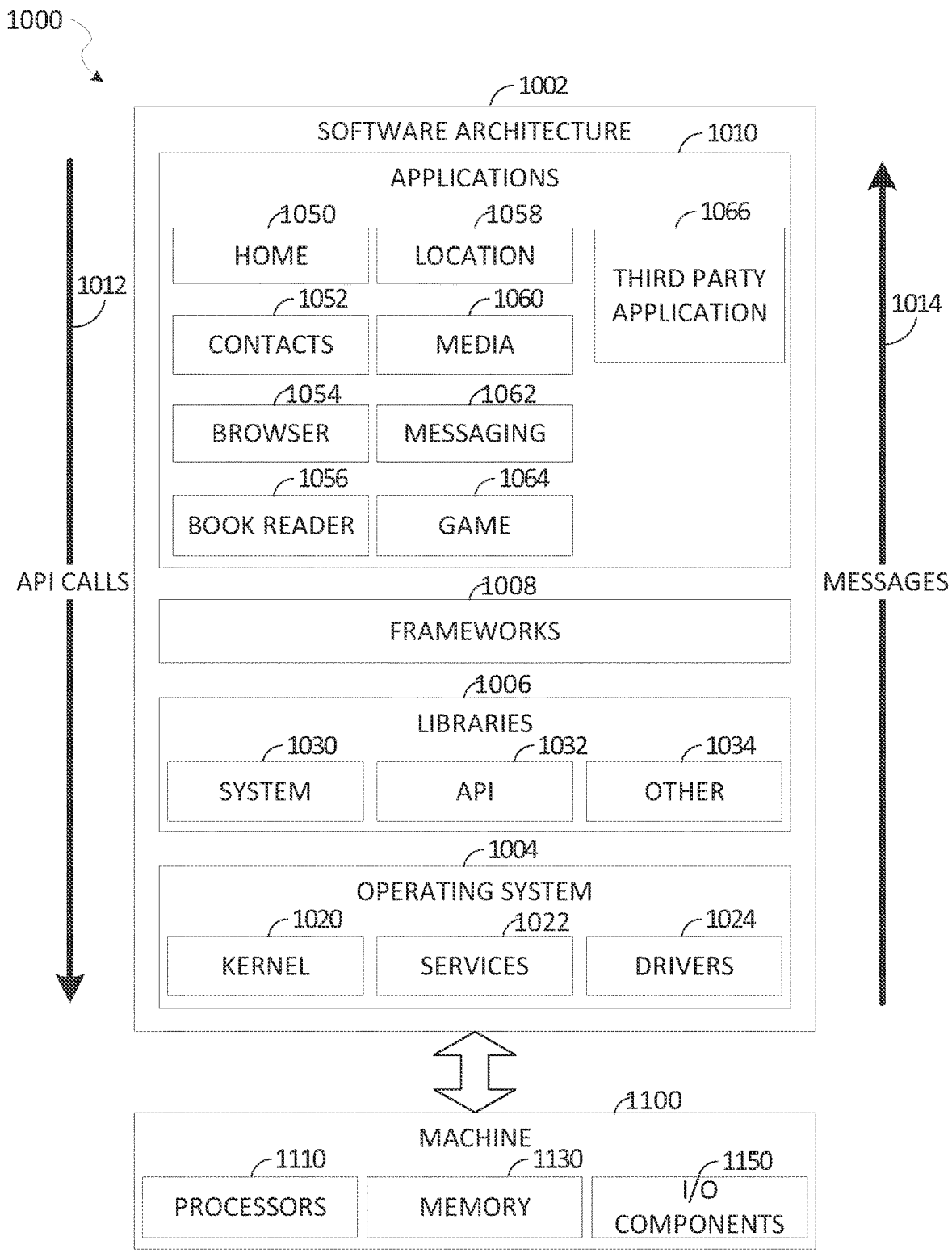
FIG. 10 is a diagram illustrating a software architecture, which can be installed on any of a variety of computing devices to perform methods consistent with those described herein.

FIG. 10 is a block diagram 1000 illustrating a software architecture 1002, which can be installed on any of a variety of computing devices to perform methods consistent with those described herein. FIG. 10 is merely a non-limiting example of a software architecture, and it will be appreciated that many other architectures can be implemented to facilitate the functionality described herein. In various embodiments, the software architecture 1002 is implemented by hardware such as a machine 1100 of FIG. 11 that includes processors 1110, memory 1130, and input/output (I/O) components 1150. In this example architecture, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke API calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers. BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec. Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various GUI functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and abroad assortment of other applications, such as a third-party application 1066. According to some embodiments, the applications 1010 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1066 can invoke the API calls 1012 provided by the operating system 1004 to facilitate functionality described herein.

Figure 11:
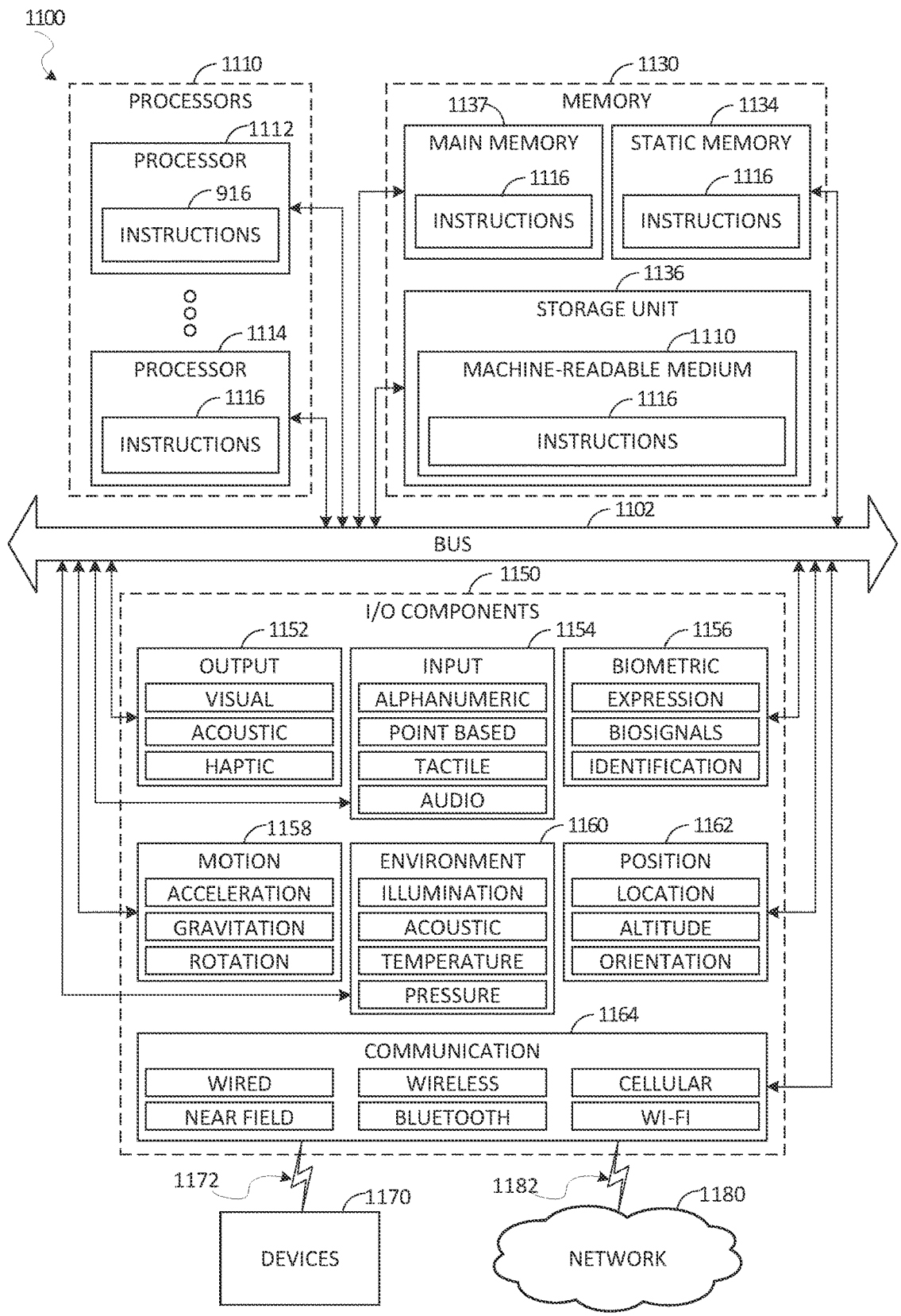
FIG. 11 is a system diagram illustrating an example of a computing device with which embodiments of the present invention might be implemented.

FIG. 11 illustrates a diagrammatic representation of a machine 1100 in the form of a computer system within which a set of instructions may be executed for causing the machine to perform any one or more of the methodologies discussed herein, according to an example embodiment. Specifically. FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example the instructions 1116 may cause the machine 1100 to execute any one of the methods or algorithmic techniques described herein. Additionally. or alternatively, the instructions 1116 may implement any one of the systems described herein. The instructions 916 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 916 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions contemporaneously. Although FIG. 11 shows multiple processors 1110, the machine 1100 may include a single processor with a single core, a single processor with multiple cores (e.g., a multi-core processor), multiple processors with a single core, multiple processors with multiples cores, or any combination thereof.

The memory 1130 may include a main memory 1132, a static memory 1134, and a storage unit 1136, all accessible to the processors 1110 such as via the bus 1102. The main memory 1130, the static memory 1134, and storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode. PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1130, 1132, 1134, and/or memory of the processor(s) 1110) and/or storage unit 1136 may store one or more sets of instructions and data structures (e.g., software) embodying or utilized by any one or more of the methodologies or functions described herein. These instructions (e.g., the instructions 1116), when executed by processor(s) 1110, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media." "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., HTTP). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system to derive a digital representation of an online meeting using contextual data inferred from non-verbal communications, the system comprising:
 a processor; and
 a memory storage device storing instructions thereon, which, when executed by the processor, cause the system to perform operations comprising:
 receiving, over a network, a first video stream from a client computing device of a first meeting participant, the first video stream originating at a video camera;
 using one or more object detection algorithms to process the first video stream to detect one or more regions of interest, each detected region of interest depicting the first meeting participant or a portion thereof,
 for each detected region of interest, applying a gesture recognition algorithm to the region of interest to detect a gesture and to generate a textual description of the detected gesture and a timestamp indicating a time during the online meeting when the detected gesture occurred;
 for each detected gesture, integrating the textual description of the detected gesture with a text-based transcript generated from a speech-to-text algorithm, wherein the integration of the textual description of the detected gesture with corresponding spoken dialogue within the transcript based on the timestamp associated with the detected gesture creates a chronological sequence of both verbal and non-verbal communications for the online meeting, and further annotating the integrated textual description of the detected gesture to include i) the timestamp for the detected gesture, and ii) information identifying the first meeting participant; and responsive to a query from an end-user of a meeting analyzer service, generating a response based on the textual description and timestamp of the detected gesture, wherein the generating of the response involves providing as input to a generative language model a text-based prompt comprising an instruction derived from at least the query from the end-user.

2. The system of claim 1, wherein the memory storage device is storing additional instructions, which, when executed by the processor, cause the system to perform additional operations comprising:

using an emotion detection algorithm to process a detected region of interest to i) detect an emotion from a facial expression of the first meeting participant and ii) generate a textual description of the detected emotion and a timestamp for the detected emotion, the timestamp indicating the time during the online meeting when the facial expression was made; and storing the textual description of the detected emotion and the timestamp for the detected emotion;

wherein the response to the query is determined, in part, based on the textual description of the detected emotion and the timestamp for the detected emotion.

3. The system of claim 1, wherein the memory storage device is storing additional instructions, which, when executed by the processor, cause the system to perform additional operations comprising:

receiving, over the network, a second video stream from a client computing device of a second meeting participant, the second video stream representing content shared by the second meeting participant with one or more other meeting participants via the online meeting;

using one or more object detection algorithms to process the second video stream to detect one or more regions of interest, each detected region of interest depicting a collection of text or a graphic; and for each detected region of interest depicting a collection of text:

using one or more layout analysis algorithms to process the collection of text to identify a structure for the collection of text;

extracting one or more word groups from the collection of text based on the identified structure for the collection of text; and storing the one or more word groups and with each word group a timestamp indicating the time during the online meeting when the collection of text, from which the word group was extracted, was shared;

wherein the response to the query is determined, in part, based on a word group and a corresponding timestamp for the word group.

4. The system of claim 3, wherein the memory storage device is storing additional instructions, which, when executed by the processor, cause the system to perform additional operations comprising:

for each detected region of interest depicting a graphic:

using a content classification algorithm to generate at least one topic tag for the graphic;

generating an image of the graphic; and storing the image of the graphic with the at least one topic tag for subsequent recall and presentation to a meeting participant.

5. The system of claim 3, wherein adding the one or more word groups to the text-based transcript for the online meeting comprises:

for each word group in the one or more word groups extracted from a collection of text, inserting the word group into a text-based transcript for the online meeting in a position relative to other text, based on the time, during the online meeting, at which the collection of text from which the word group was extracted was shared by the second meeting participant; and annotating the word group to include i) the timestamp for the word group, and ii) information identifying the second meeting participant.

6. The system of claim 1, wherein at least one region of interest depicting the first meeting participant is depicting a head of the first meeting participant or a hand of the first meeting participant; and using one or more gesture recognition algorithms to process each region of interest to detect a gesture comprises detecting a hand gesture or a head gesture.

7. The system of claim 3, wherein the response to the query is determined by constructing a text-based prompt and providing the text-based prompt, as input, to a generative language model, the text-based prompt comprising context and an instruction, wherein the one or more word groups and their corresponding timestamps are included in the context, and the instruction is determined based on the query.

8. A computer-implemented method comprising:

receiving, over a network, a first video stream from a client computing device of a first meeting participant, the first video stream originating at a video camera;

using one or more object detection algorithms to process the first video stream to detect one or more regions of interest, each detected region of interest depicting the first meeting participant or a portion thereof;

for each detected region of interest, applying a gesture recognition algorithm to the region of interest to detect a gesture and to generate a textual description of the detected gesture and a timestamp indicating a time during an online meeting when the detected gesture occurred;

for each detected gesture, integrating the textual description of the detected gesture with a text-based transcript generated from a speech-to-text algorithm, wherein the integration of the textual description of the detected gesture with corresponding spoken dialogue within the transcript based on the timestamp associated with the detected gesture creates a chronological sequence of both verbal and non-verbal communications for the online meeting, and further annotating the integrated textual description of the detected gesture to include i) the timestamp for the detected gesture, and ii) information identifying the first meeting participant; and responsive to a query from an end-user of a meeting analyzer service, generating a response based on the textual description and timestamp of the detected gesture, wherein the generating of the response involves providing as input to a generative language model a text-based prompt comprising an instruction derived from at least the query from the end-user.

9. The computer-implemented method of claim 8, further comprising:

using an emotion detection algorithm to process a detected region of interest to i) detect an emotion from a facial expression of the first meeting participant and
ii) generate a textual description of the detected emotion and a timestamp for the detected emotion, the timestamp indicating the time during the online meeting when the facial expression was made; and storing the textual description of the detected emotion and the timestamp for the detected emotion;

wherein the response to the query is determined, in part, based on the textual description of the detected emotion and the timestamp for the detected emotion.

10. The computer-implemented method of claim 8, further comprising:

receiving, over the network, a second video stream from a client computing device of a second meeting participant, the second video stream representing content shared by the second meeting participant with one or more other meeting participants via the online meeting;

using one or more object detection algorithms to process the second video stream to detect one or more regions of interest, each detected region of interest depicting a collection of text or a graphic; and for each detected region of interest depicting a collection of text:

using one or more layout analysis algorithms to process the collection of text to identify a structure for the collection of text;

extracting one or more word groups from the collection of text based on the identified structure for the collection of text; and storing the one or more word groups and with each word group a timestamp indicating the time during the online meeting when the collection of text, from which the word group was extracted, was shared;

wherein the response to the query is determined, in part, based on a word group and a corresponding timestamp for the word group.

11. The computer-implemented method of claim 10, further comprising:

for each detected region of interest depicting a graphic:

using a content classification algorithm to generate at least one topic tag for the graphic;

generating an image of the graphic; and storing the image of the graphic with the at least one topic tag for subsequent recall and presentation to a meeting participant.

12. The computer-implemented method of claim 10, further comprising:

for each word group in the one or more word groups extracted from a collection of text, inserting the word group into a text-based transcript for the online meeting in a position relative to other text, based on the time, during the online meeting, at which the collection of text from which the word group was extracted was shared by the second meeting participant; and annotating the word group to include i) the timestamp for the word group, and ii) information identifying the second meeting participant.

13. The computer-implemented method of claim 8, wherein at least one region of interest depicting the first meeting participant is depicting a head of the first meeting participant or a hand of the first meeting participant; and using one or more gesture recognition algorithms to process each region of interest to detect a gesture comprises detecting a hand gesture or a head gesture.

14. The computer-implemented method of claim 10, wherein the response to the query is determined by constructing a text-based prompt and providing the text-based prompt, as input, to a generative language model, the text-based prompt comprising context and an instruction, wherein the one or more word groups and their corresponding timestamps are included in the context, and the instruction is determined based on the query.

15. A system to derive a digital representation of an online meeting using contextual data inferred from non-verbal communications, the system comprising means for receiving, over a network, a first video stream from a client computing device of a first meeting participant, the first video stream originating at a video camera;

means for using one or more object detection algorithms to process the first video stream to detect one or more regions of interest, each detected region of interest depicting the first meeting participant or a portion thereof, for each detected region of interest, means for applying a gesture recognition algorithm to the region of interest to detect a gesture and to generate a textual description of the detected gesture and a timestamp indicating a time during the online meeting when the detected gesture occurred;

for each detected gesture, means for integrating the textual description of the detected gesture with a text-based transcript generated from a speech-to-text algorithm, wherein the integration aligns the textual description of the detected gesture with corresponding spoken dialogue within the transcript based on the timestamp associated with the detected gesture to create a unified chronological sequence of both verbal and non-verbal communications for the online meeting, and further annotating the integrated textual description of the detected gesture to include i) the timestamp for the detected gesture, and ii) information identifying the first meeting participant; and responsive to a query from an end-user of a meeting analyzer service, generating a response based on the textual description and timestamp of the detected gesture, wherein the generating of the response involves providing as input to a generative language model a text-based prompt comprising an instruction derived from at least the query from the end-user.

16. The system of claim 15, further comprising:

means for receiving, over the network, a second video stream from a client computing device of a second meeting participant, the second video stream representing content shared by the second meeting participant with one or more other meeting participants via the online meeting;

means for using one or more object detection algorithms to process the second video stream to detect one or more regions of interest, each detected region of interest depicting a collection of text or a graphic; and for each detected region of interest depicting a collection of text:

means for using one or more layout analysis algorithms to process the collection of text to identify a structure for the collection of text;

means for extracting one or more word groups from the collection of text based on the identified structure for the collection of text; and means for storing the one or more word groups and with each word group a timestamp indicating the time during the online meeting when the collection of text, from which the word group was extracted, was shared;

wherein the response to the query is determined, in part, based on a word group and a corresponding timestamp for the word group.

17. The system of claim 1, wherein the memory storage device is storing additional instructions, which, when executed by the processor, cause the system to perform additional operations comprising:
   utilizing the timestamp associated with the textual description of the detected gesture to synchronize playback of a video segment from the first video stream with the corresponding portion of the text-based transcript, wherein the synchronization enables an end-user to view the detected gesture in context with the spoken dialogue at the specific time it occurred during the online meeting.

18. The computer-implemented method of claim 8, further comprising:
   utilizing the timestamp associated with the textual description of the detected gesture to synchronize playback of a video segment from the first video stream with the corresponding portion of the text-based transcript, wherein the synchronization enables an end-user to view the detected gesture in context with the spoken dialogue at the specific time it occurred during the online meeting.

* * * * *